Aug. 2, 1938.  M. FEDER  2,125,778
CONTINUOUS METHOD OF TREATING EDIBLE FLUIDS
Original Filed May 10, 1935   8 Sheets-Sheet 1

Aug. 2, 1938. M. FEDER 2,125,778
CONTINUOUS METHOD OF TREATING EDIBLE FLUIDS
Original Filed May 10, 1935 8 Sheets-Sheet 2

Inventor
MILTON FEDER
By William C. Sintow.
Attorney

Aug. 2, 1938.  M. FEDER  2,125,778
CONTINUOUS METHOD OF TREATING EDIBLE FLUIDS
Original Filed May 10, 1935  8 Sheets-Sheet 3

Inventor
MILTON FEDER
By William C. Linton.
Attorney

Inventor
MILTON FEDER
By William C. Linton.
Attorney

Aug. 2, 1938. M. FEDER 2,125,778
CONTINUOUS METHOD OF TREATING EDIBLE FLUIDS
Original Filed May 10, 1935 8 Sheets-Sheet 7

Fig. 22.

Inventor
MILTON FEDER
By William C. Linton.
Attorney

Fig. 23.

Inventor
MILTON FEDER
By William C. Linton.
Attorney

Patented Aug. 2, 1938

2,125,778

UNITED STATES PATENT OFFICE 2,125,778

CONTINUOUS METHOD OF TREATING EDIBLE FLUIDS

Milton Feder, Lancaster, Calif.

Application May 10, 1935, Serial No. 20,860
Renewed April 14, 1938

1 Claim. (Cl. 99—136)

My invention relates to freezers for freezing ice cream and similar food products, and more particularly to a small portable compact type of freezer suitable for use on a store counter or in the home for instantly freezing a small individual portion of ice cream.

Counter ice cream freezers have heretobefore been described in which small quantities of fluid mixture have been quickly frozen, but they have been found to embody marked disadvantages which have greatly detracted from their usefulness and delayed their introduction. Some of these disadvantages have been that no provision was made for heating the sprayer head whereby the liquid was discharged cold in large globules from the orifices in the sprayer head into the freezer chamber, and comparatively large crystals were formed in the cream, and the sprayer head got so cold that the orifices therein froze and became clogged. In such freezers heretofore employed, the mix has been exposed to the atmosphere at various points between the time that it is poured into the mix container and the time that it is delivered in frozen condition, resulting in contamination with dirt and organisms. Also in counter freezers heretobefore employed, all of the ingredients have had to be chilled to nearly freezing point before delivery to the freezer.

In the bulk production of ice cream as ordinarily carried out in factories, the exact method of mixing the ingredients and the exact temperature at which operations are conducted, are very critical, and slight deviations from the correct values will result in spoiling the batch, such as by forming butter or buttermilk. Also, in such bulk manufacture, in order to get a product of suitably hard texture, it is necessary to place the frozen cream in hardening rooms at low temperature for 24 hours or longer. This process decidedly limits the amount of flavoring which will be retained in the product, and also results in forming large ice crystals in the hardened cream due to the slow freezing, which gives it a coarse texture.

Ice cream as manufactured today in ice cream factories in bulk usually consists of a standard mixture, composed of the following:

| | Per cent |
|---|---|
| Sucrose | 15 |
| Butter fat | 10 |
| Serum solids | 12 |
| Gelatine | ½ |
| Water | 62½ |

In the usual practice, only about 15% of the water is frozen in a batch freezer. In the factory process, if a larger percentage is frozen in the freezer, the ice cream becomes so solid and rigid that great difficulty is encountered in discharging the contents from the freezer. In the factory process, real freezing does not occur until the ice cream is placed in the hardening room, and then the water freezes first, slowly into large ice crystals, and the other ingredients freeze later. The fact that the different ingredients form into crystals at successive separated times, results in a rough texture. In the factory process, also, at various stages it is necessary to pour or ladle the mix from one can into another, and to run the mix through pipes, which causes contamination.

An object of my invention is to provide a counter ice cream freezer wherein the foregoing disadvantages are avoided, which is portable, and which will produce an ice cream of fine creamy texture and grain and with extremely small crystals, without large ice or frost crystals and without coarse grains, and which will flavor each individual portion with any desired flavor.

Another object is to provide a freezer which will begin to freeze and deliver the frozen cream instantly on the touch of a button, and which will freeze and deliver a complete individual portion in about one half minute.

Another object is to provide an agitating refrigerating unit which will chill any desired liquid to be consumed in liquid form such as tomato juice, or frappe drinks, to any desired temperature without freezing, and at the same time aerate such liquid and give it an iridescent appearance.

Another object of my invention is to provide a process and apparatus whereby liquid may be treated quickly and instantly served in individual portions, in a fluffy but hard frozen state, and moulded into forms if desired.

A further object of my invention is to provide an apparatus wherein the mixture is hermetically sealed from the air from the moment it is poured into the storage receiving chamber to the moment it is discharged into the freezing chamber.

A still further object of my invention is to provide an apparatus wherein the mixture is pasteurized while passing therethrough by the application of heat, and to discharge the mixture into the freezing chamber as an extremely finely divided vapor or fog by heating the mixture just before it is discharged, thereby forming a frozen fog in the freezing chamber.

Another object is to provide means for adjustably controlling the porosity and the amount of overrun, for keeping the vaporizing orifices open at all times, and for agitating the liquid as a restricted stream just before discharging it into the freezing chamber.

Another object is to provide a novel form of rotating impeller to deliver the liquid as very fine particles into the freezing chamber.

Another object is to deliver the frozen product in large pieces or flakes of a very fine and creamy texture.

Another object is to freeze the entire mix at the same instant instead of freezing the water first and other ingredients successively.

Other objects of the invention are in part obvious and in part pointed out hereinafter.

In the system of my invention, the liquid ice cream mixture is poured into a receiving tank, which in counter freezers of usual size will hold several gallons. It is then beaten with revolving paddles in the same or another chamber to make it homogeneous and to break up some of the large fat globules. It is then delivered through an aerating head into the interior channel of a cylindrical casing, through which it passes in contact with a longitudinal heating element therein and is raised to the pasteurizing temperature of approximately 143° F.

The cylindrical casing itself does not revolve, but comprises a central rotatable spindle and means for rotating the same. At the delivery end of the casing there is a rotatable impeller unit of novel construction which is carried on the spindle, and which throws the liquid in discrete streams through a bent passage and a narrow annular space into the freezing chamber, where it at once vaporizes and becomes a frozen fog. The axial depth of the annular space is adjustable. Immediately after leaving contact with the heater, a stream of cold air may be directed into the stream of fluid, to reduce it from the pasteurizing temperature of about 143° to some lower temperature such as 80° F. at which it is discharged into the freezing chamber. The heating element is carried as close as possible to the annular delivery space, and the impeller blades, so that heat is applied to the latter to avoid freezing and clogging of the discharge orifice and the impeller spaces. Rheostat means is provided for adjusting the heat produced by the electric unit. Maintaining the fluid at a temperature of 80° in the vaporizer head right up to the point of delivery into the freezing chamber keeps the fat globules in a melted condition, and the bent path through which the fluid is forced in the vaporizer head also serves to break up the fat globules.

The whole cylindrical casing is reciprocated axially inside the cylindrical freezing chamber whose walls are maintained at a freezing temperature. The vaporized liquid discharged by the impeller blades through the annular discharge space is deposited as successive thin films or layers on the wall of the freezer chamber as the casing passes back and forth along its axis. After the casing has thus deposited a suitable number of layers of the frozen product, a scraper locks onto the cylindrical casing and scrapes the product from the wall of the freezing chamber. Heat is also transmitted to the scraper from the heating unit, which maintains room temperature, facilitates the heating operation, and prevents cream from sticking to the scraper. The end of the casing has a bossed cupped surface which folds over the surface of the frozen product as it is scraped from the freezing chamber.

In the counter freezer of my invention, it is possible to freeze small individual portions at a time, such as two ounces of mix, and to add any selected one of a number of flavors to each portion. In my freezer, the ice cream is as hard when it is delivered after a few seconds in the freezing cylinder, as it is in the process of commercial batch ice cream factories after it has been stored in the hardening room.

In using my counter freezer, the ice cream is made just as needed, which avoids waste.

In ice cream produced by the factory process and stored in the hardening room, the crystals occur in lengths from 150 microns up, whereas in ice cream produced by my process, the crystals occur in lengths shorter than 25 microns, which represents a much finer grain and texture of the product.

Because in my method all of the steps of the process are carried out in rapid succession in a few seconds, the exact temperature and other conditions are not critical as in batch freezing.

The counter freezer of my invention entirely eliminates the scoop and its unsanitary features, and also eliminates the considerable loss to the dealer from reducing the overrun by squeezing the ice cream with the scoop in removing it from the freezer. With my freezer, two ounces of mix will produce a portion corresponding to a No. 12 scoop, i. e., twelve scoops to a quart. As now used, a No. 12 scoop will not give over 80 scoops to 2½ gallons of ice cream in the freezer.

With my freezer, it is possible to instantly make not only any desired flavor of ice cream, but also French mouse, sherbets, water ices, malted milks, frappe drinks, and similar products.

All of the elements of my freezer are easily accessible for purposes of sterilization.

The frozen cream may be transferred from the ejector directly into a mould of any desired shape, such as an ornamental design or representation of a flag, animal, flower, or famous building or person, to meet particular occasions. Such special moulded individual portions may be produced to order on a moment's notice by my invention. This is possible because the cream produced by my method is completely frozen. With the commercial batch method, orders for such special moulds must be given 24 hours in advance and they must be placed in the hardening room to harden.

In order that my invention and its mode of operation may be readily understood by persons skilled in the art, I have in the accompanying illustrative drawings and in the detailed following description based thereon, set out an embodiment of the same.

This horizontal form of my invention, which employs air driven reciprocating engines as driving means, has advantages for particular purposes, and the addition of a stream of cold air under pressure to the mixture after pasteurization and just before entrance into the impeller chamber, has been found to facilitate the vaporizing action of the impeller head.

Figures 1, 2, 5, 6:
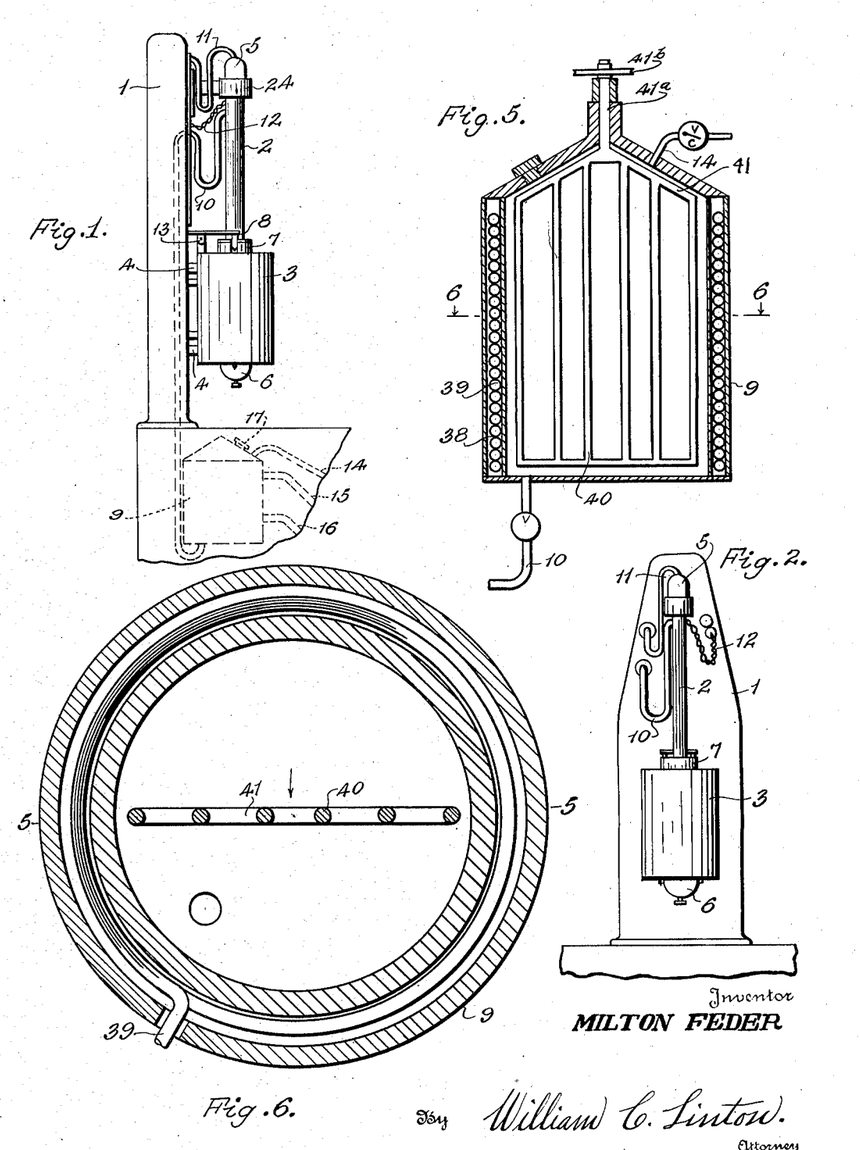
Fig. 1 is a side view of the general assembly of the freezing chamber and storage receiving chamber of a preferred form of my invention.
Fig. 2 is a front view of the general assembly of Fig. 1.
Fig. 5 is a vertical sectional view of the storage receiving chamber taken on the line 5—5 of Fig. 6.
Fig. 6 is a horizontal sectional view of the storage receiving chamber taken on the line 6—6 of Fig. 5.

Referring to the figures in detail, in Fig. 1, the mounting frame 1 supports a hollow cylindrical casing 2 which is vertically displaceable axially through a hollow cylindrical freezing chamber 3, but does not rotate. The cylindrical freezing chamber 3 is provided in its wall with a refrigerating coil having inlet and outlet 4—4 for the refrigerating fluid. I have found methyl chloride particularly suitable as a refrigerating fluid for this type of freezer. Axially positioned inside the hollow cylindrical casing 2 is a spindle which is rotatably driven by suitable driving means 5 positioned at the upper end of the casing, which may conveniently be an air turbine. The freezing chamber 3 is provided with a central cylindrical freezing space which is closed at its upper end by the cylindrical casing 2 and the scraper head carried thereon, and is closed at its lower end by the ejector cup 6. The scraper blade for scraping the cream from the interior freezing wall of the freezer chamber is carried on a collar 7 slidably mounted on cylindrical casing 2, and tightly engageable upon casing 2 by the action of locking pin 8ª, carried by the arm 8 which when engaged between the two rings of collar 10 7 maintains the collar out of tight engagement with casing 2, whereupon the natural friction of the parts and the friction of the scraper blade against the freezing wall of the freezing chamber will keep the scraper head and its blade in a fixed position at the top of the freezing chamber. However, when locking pin 8ª is withdrawn, the rings of collar 7 are pulled together by springs and force pins into recesses in cylindrical casing 2, tightly locking scraper collar 7 onto the casing, and forcing the scraper head and the scraper blade to travel up and down with the reciprocating motion of cylindrical casing 2, scraping along the freezing surface of freezer chamber 3, and scraping the frozen cream therefrom downwardly into ejector 6.

The ice cream mixture is stored at a temperature of approximately 40° to prevent spoiling in the storage chamber 9, which is also provided with rotatable paddles for the purpose of thoroughly stirring the mixture and breaking up any large fat globules. The mixture is delivered from storage chamber 9 through a pipe 10 to an entrance into the cylindrical casing 2. Air for driving the air turbine 5 is supplied by an air line 11. Inside of the cylindrical casing 2 and adjacent to the mix pipe constituting an extension of mix feed line 10 is positioned an electrical heating unit connected by wires 12 to a source of electrical energy. Locking pin carrying arm 8 is movably mounted on a pivot 13. Air under pressure is forced into storage chamber 9 through an air line 14, and the pressure is controlled by a pressure controlled valve at the inlet. The wall of storage chamber 9 is provided with a refrigerating coil and is supplied with refrigerating fluid through an inlet 16, which is discharged through an outlet 15. The ice cream mixture is poured into storage chamber 9 through an upper opening 17.

Figures 3, 4:
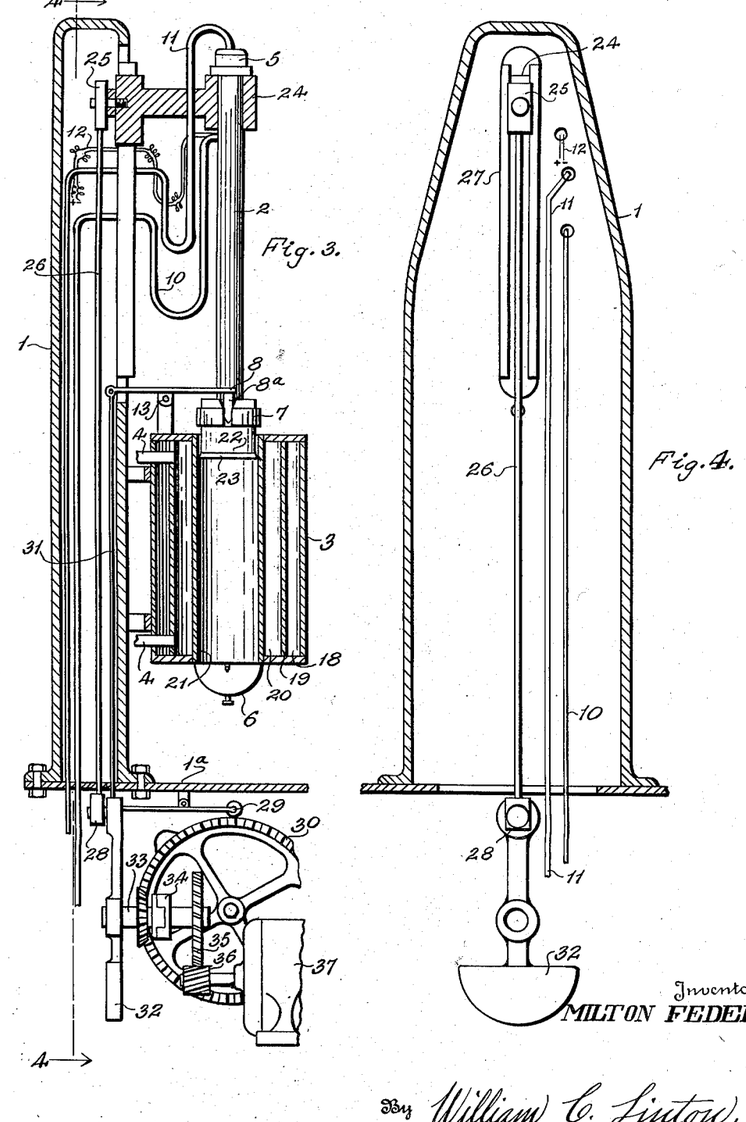
Fig. 3 is a side view partly in section of the assembly of freezing chamber and adjacent parts and showing actuating mechanism.
Fig. 4 is a sectional view of the assembly of Fig. 3, taken on the line 4—4 of Fig. 3.

Referring to Figs. 3 and 4, the detailed structure of freezing chamber 3 is shown, including the central cylindrical freezing wall 21, and the cylindrical intermediate partition wall 19 between the outer wall 3 and the freezing wall 21, forming an intermediate insulating space 18 which may advantageously be filled with heat insulating material such as cork, and also forming refrigerating space 20 which contains the refrigerating coils. Collar 7 carries a conical scraper head 22 centrally interiorly recessed to form a cupped surface and carrying on its outer conical surface a scraper blade member also formed conically, and retained in position by a conical sleeve held tightly thereover. The scraper edge, shown as 23, may suitably be formed of a stiff sheet of celluloid 55, which has been found to have suitable resilient properties for tightly engaging the freezer wall and conforming to any slight irregularities therein. A supporting arm 24 carries cylindrical casing 2. Arm 24 is provided with a crank head 25 which is slidable in a crank slideway 27. The crank head 25 is connected by crank shaft 26 to crank pin 28 carried on crank 32. Crank 32 is rotatable by shaft 33, connected by disengageable clutch 34, from engagement with gear 35 engaging with worm 36, which is driven by an electric motor 37. Locking pin 8 is moved about pivot 13 under the action of a shaft 31, which is displaced by an arm 29 which engages a cam 30, actuatable once for a determined number of revolutions of crank 32. Shaft 33 and cam 30 are driven by the same means. Clutch 34 is thrown into engagement only when cream is actually being frozen in the freezing chamber. In operation, it is usually found desirable to have about two scraping strokes of the scraper blade to twelve vaporizing strokes.

Referring to Figs. 5 and 6, storage chamber 9 is provided in its wall with a refrigerating space 38 containing refrigerating coil 39, which is connected with refrigerating fluid inlet 16 and outlet 15. The ice cream mixture is poured in through aperture 17, and air under pressure is supplied through an air line 14 under the control of a pressure controlled valve. The ice cream mixture after stirring is discharged from outlet pipe 10. Vertically disposed in the storage chamber are a plurality of scraper blades or rods 40 carried on a rotatable frame 41, mounted on and rotatable about a shaft 41a. The shaft 41a may be driven by a pulley 41b as shown in Fig. 5, or may be direct-connected to the driving motor.

Figures 7, 8, 9, 10:
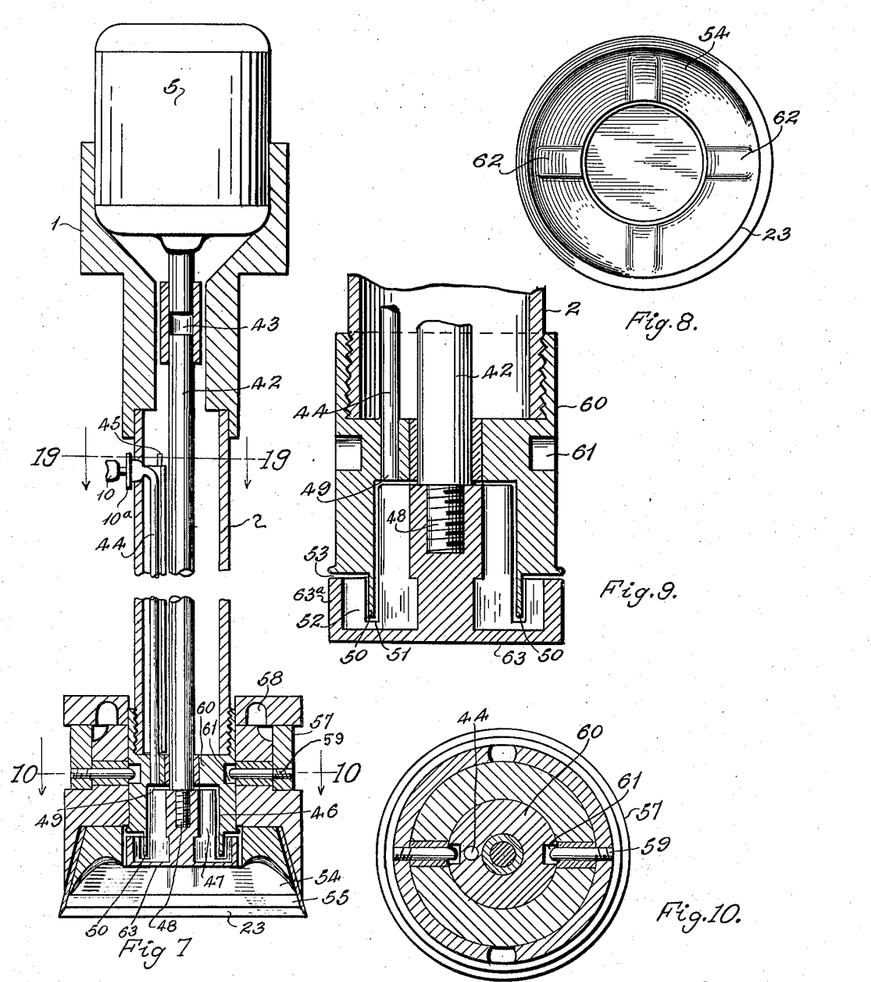
Fig. 7 is a detailed view partly in section of the cylindrical casing and its driving means, and the cylindrical plunger scraping unit.
Fig. 8 is an end view of the cupped head of the scraper plunger, showing the bosses on the cupped surface for directing the scraped cream.
Fig. 9 is an enlarged vertical sectional view of the extreme lower end of the cylindrical casing of Fig. 7 showing the detail of the vaporizer head and the impeller blades.
Fig. 10 is a cross sectional view of the pin locking mechanism of the scraper head, taken on the line 10—10 of Fig. 7.
Figure 11:
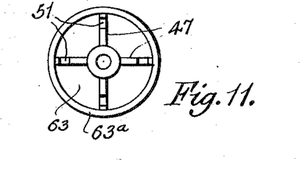
Fig. 11 is a top view of the impeller of Fig. 9 removed from the surrounding unit, showing the impeller blades.
Figure 12:
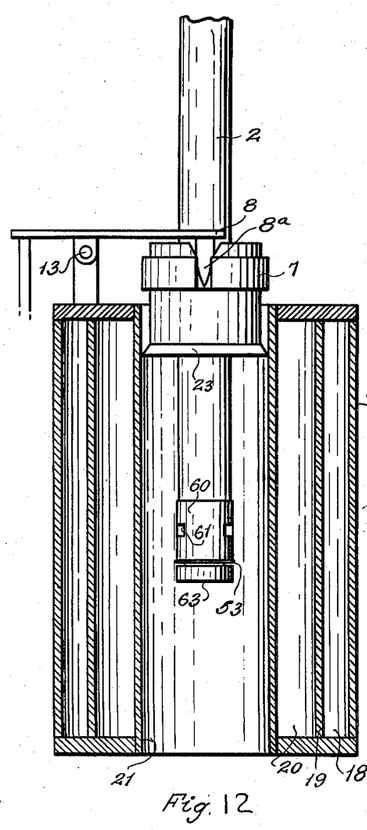
Fig. 12 is a detail vertical sectional view of the freezing chamber, showing the scraper head and locking mechanism with the finger engaged and the collar unlocked.
Figure 13:
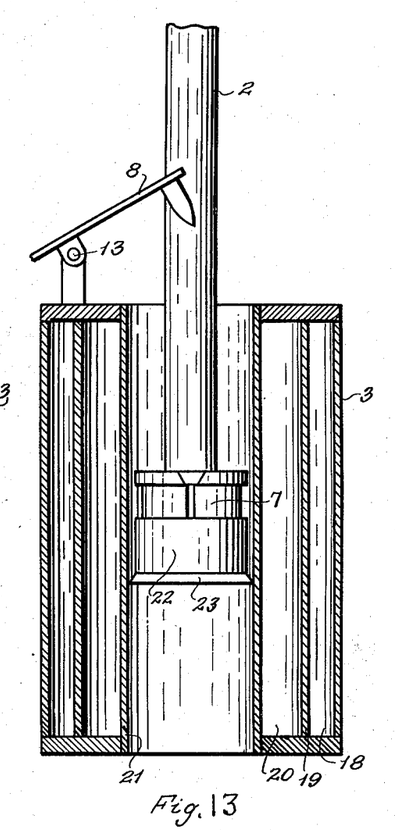
Fig. 13 is a view similar to Fig. 12, showing the finger out of engagement and the collar locked.

Referring to Fig. 7, the cylindrical casing 2 is provided with a hollow cylindrical space wherein is rotatably mounted a shaft 42 held by a clamp 43 and driven by motor 5 which may be an air turbine or electric motor or other suitable driving means. Between shaft 42 and the casing wall is longitudinally positioned mix feed pipe 44 which connects with mix feed line 10 through an entrance tube which is shown in detail in Fig. 21, through which air is also admitted through entrance 10a and mixed with the mixture before entering pipe 44. Also positioned longitudinally in the casing and adjacent to mix feed pipe 44 is an electrical heater unit 45 which is conveniently in the form of a loop having adjacent terminals near to the entrance of pipe 44, and which is connected to supply wires 12. In the end of cylindrical casing 2 there is provided a terminal axial cylindrical chamber 46 which is the impeller chamber wherein an impeller blade unit is rotatably mounted on shaft or spindle 42. The impeller blade unit comprises a plurality of axially disposed impeller blades 47 which, I have found may desirably consist of four blades each about one-half inch in length, since I have found that a larger number of blades or longer blades do not operate as well. Blades concave in the direction of rotation are preferably employed. The mix feed line 44 terminates at the top of impeller chamber 46 through one or more apertures 49. The mix feed line 44 passes through a collar 60 before so terminating, and the heater unit 45 stops short of collar 60. Collar 60 is provided with a narrow terminal flange 50 which projects adjacent the impeller chamber nearly into contact with the transverse terminal surface 63 of the impeller chamber forming a narrow annular passage 51 therebetween through which the mixture is discharged with considerable velocity from the impeller blades, and agitated by passing through such narrow passage. The mixture then passes at right angles upwardly a short distance parallel to projection 50 through passage 52 between projection 50 and flange 63a carried on the terminal portion 63 and outward through a narrow annular passage 53 between collar 60 and the outward flange 63a of terminal member 63 of the impeller unit. The axial opening 53 is adjustable by adjusting the position of the impeller unit on shaft 42 by screw 48. The liquid mixture is heated by the electric heater unit in the cylindrical casing to a pasteurizing temperature of approximately 144° F., and in the form of my invention here described, is supplied at substantially that temperature to the impeller chamber. Under the action of the impeller unit, the mixture is therefore discharged with considerable velocity and pressure after agitation through opening 53 into the freezing chamber maintained at a temperature lower than 32°, and this sudden considerable drop in temperature instantly converts the mixture into a vapor or fog which is centrifugally forced to the freezing wall 21 of the freezing chamber 3 as cylindrical casing 2 is reciprocated up and down axially through freezing chamber 3. In this manner, the entire surface of freezing surface 21 of freezing chamber 3 is covered with the frozen vaporized cream mixture, which can be considered a frozen fog.

The scraping collar 57 is slidable along collar 60 attached to casing 2 when pins 59 are not in engagement with recesses 61 formed in collar 60. When pin 8a is forced into engagement between the two rings of collar 7 they are forced apart and pins 59 are forced out of engagement with recesses 61 and collar 60. When pin 8a is withdrawn from engagement between the rings of collar 7, as has been previously described, these rings are drawn together by springs positioned in aperture 58 and collar 57, and pins 59 are forced into engagement with recesses 61, locking collar 57 and the entire scraper head to cylindrical casing 2.

The entire impeller head 47—63 is screwably detachable from driving spindle 42.

In Fig. 8, there is shown in detail the bosses 62 provided on the recessed cupped surface 54 of scraper head 22 when locked into position adjacent to vaporizer head 63. I have found these bosses on the cupped surface to greatly facilitate the scraping operation, since they cause the frozen cream as scraped from the freezing surface to fold over and break off into small pieces which drop into the ejector. If the bosses are not provided, there is a tendency to eject an entire cylindrical surface, which is not desirable.

I have found that it is desirable to provide the scraping edge of the scraping member 23 with a scalloped edge, which also facilitates breaking up the scraped product into pieces of desired size.

Figure 14:
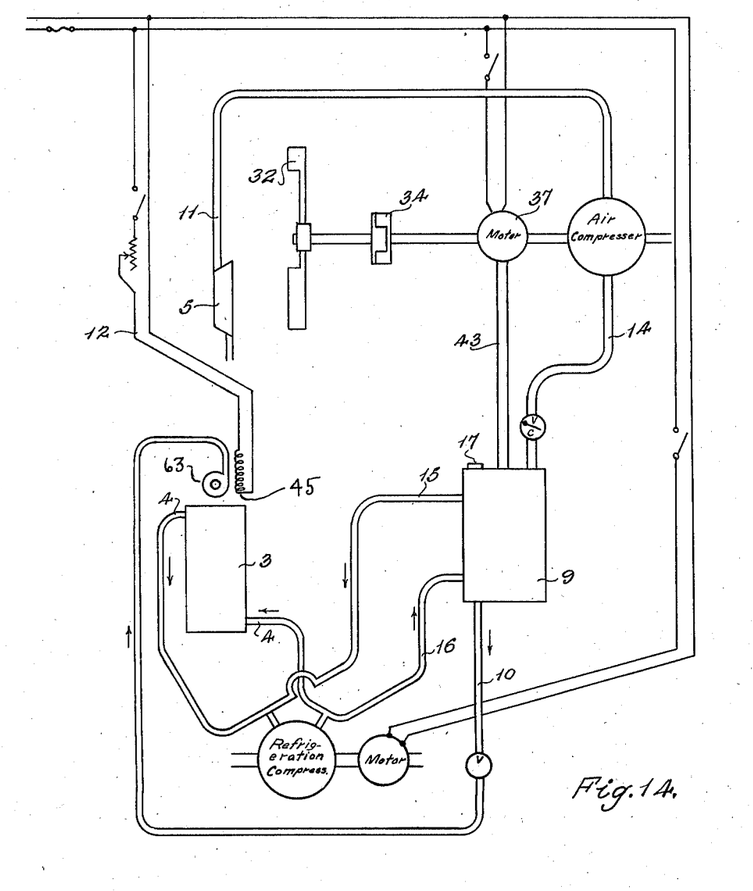
Fig. 14 is a schematic diagram of the operating relationships of the various elements showing the course of the several fluid paths, and the electric circuit connections.
Figure 15:
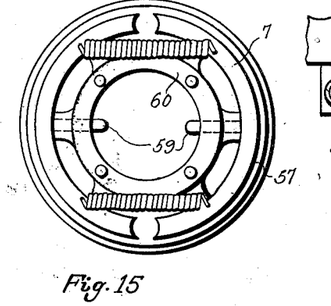
Fig. 15 is a detailed transverse view of the collar scraper head with the pins in locked position.
Figure 16:
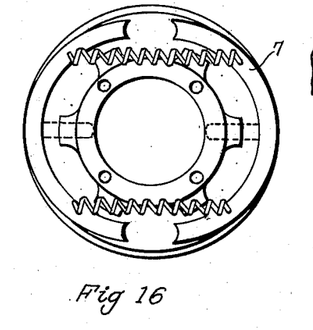
Fig. 16 is a detailed transverse view of the collar scraper head with the pins forced into released position.

From Fig. 14, the course of the path of the mixture from the storage chamber into the freezing chamber will be more clear, and also the paths of the air supplied to the air turbine and to the storage chamber, and the shaft connections from the motor to the crank, to the air compressor, and to the storage chamber paddles. This figure also shows the paths of the refrigerating fluid from the refrigeration compressor to the freezing chamber and to the storage chamber.

Figure 17:
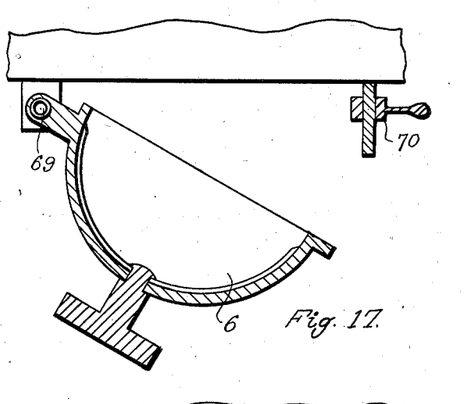
Fig. 17 is a detailed view of the ejector for delivering the frozen ice cream, in open position.
Figure 18:
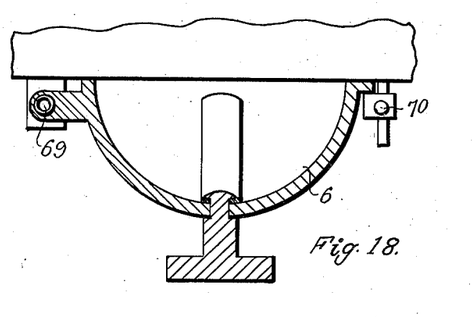
Fig. 18 is a detailed view of the ejector, in closed position.

The ejector cup 6 is pivotally mounted at 69 and is normally held in closed position by locking means 70 as shown in Figs. 17 and 18.

Figure 19:
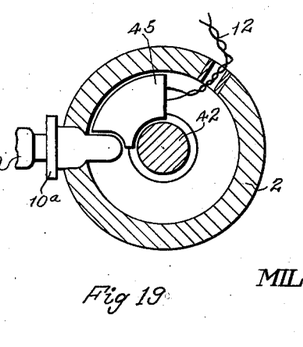
Fig. 19 is a cross sectional view of the cylindrical casing taken on the line 19—19 of Fig. 7, showing the inlet for the mixture.

As shown in Fig. 19, the mixture from mix feed line 10 passes into mix feed pipe 44 through a tube, into which air is also drawn through an air inlet collar 10a. In Fig. 19 is also shown the upper terminal portion of electrical heater unit 45, with its connection to supply wires 12.

Figure 20:
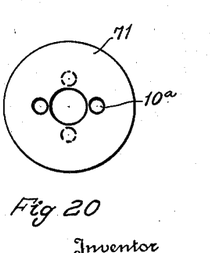
Fig. 20 is a cross sectional view of the fluid inlet, taken on the line 20—20 of Fig. 21.
Figure 21:
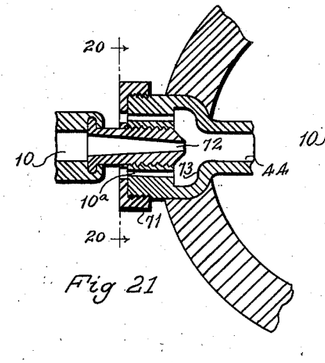
Fig. 21 is a detailed sectional view of the inlet tube for admitting the mixture and air in combination into the cylindrical casing.

In Fig. 21 is shown in detail the admission tube connecting mix feed line 10 to mix feed pipe 44, including the Venturi tube 72, and the annular passage surrounding the Venturi tube. Both the Venturi tube and the annular air inlet discharge into chamber 73 which connects with mix feed pipe 44. Fig. 20 shows a cross section of the air intake taken on the line 20—20 of Fig. 21, illustrating the several air intake apertures. The angular position of these air intake apertures may be adjusted by rotating thumb knob member 71 wherein such apertures are provided, in order to adjust the amount of air intake, and thereby adjust the over-run of the product. The draft caused by the impeller unit is sufficient to draw in a very considerable volume of air through this air intake, but in some cases it may be found desirable to supply air under pressure at this air intake, in the manner provided in the modification of my invention shown in Fig. 22.

Figure 22:
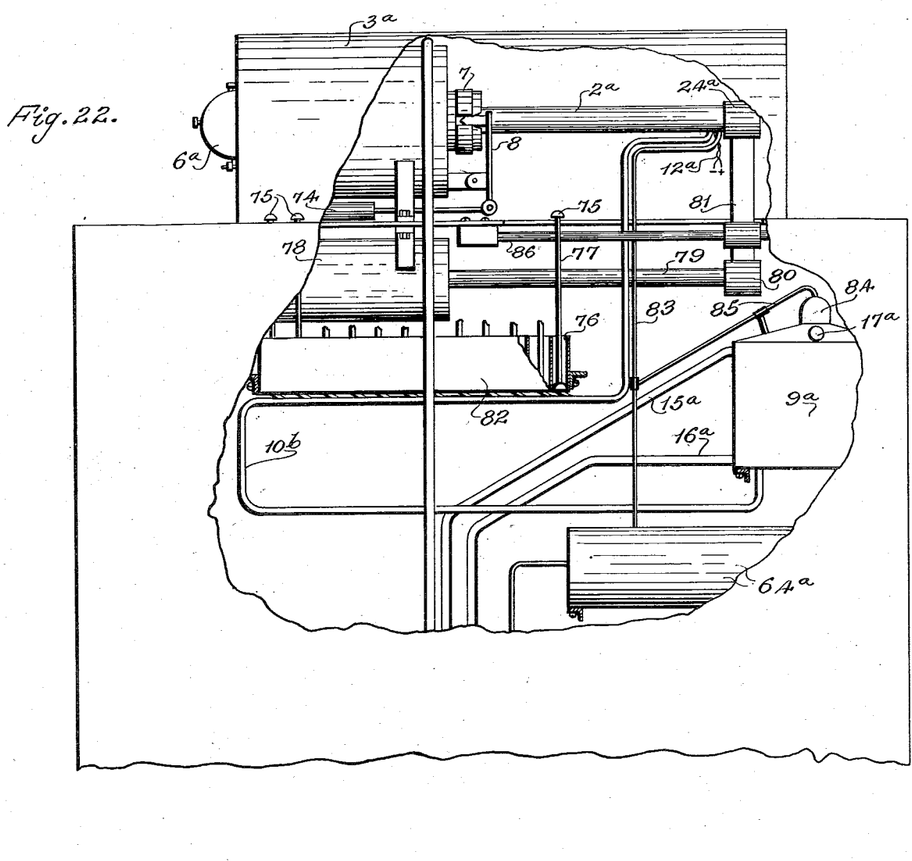
Fig. 22 is a general assembled view with parts broken away of a modified form of my invention, with a freezing chamber and cylindrical casing in horizontal position.

Referring to Fig. 22, the freezing chamber 3a and the cylindrical casing 2a, together with the other essential elements, correspond generally to those shown in the preferred form of my invention illustrated in Fig. 1. The reciprocating movement of the cylindrical casing is provided by a reciprocating air driven engine 78 having a piston 79 and piston head 80 connected by arm 81 with head 24a on cylindrical casing 2a. Flavoring tank 82 is provided with a plurality of compartments containing respectively different flavors, each of said compartments being provided with a discharge outlet into mix feed line 10b from storage chamber 9a to the mix intake on the cylindrical casing 2a. The discharge of each of these flavors into the mix feed line is controllable by depressing the corresponding button 75 which controls the shaft extending into the corresponding flavor compartment 76. The withdrawal of the locking pin 8 is controlled by a small separate reciprocating air engine 74, which is actuated by air supplied at the proper instant to initiate the scraping stroke, corresponding to the action of the form of my invention above described. The air under pressure delivered from the air compressor is stored in air tank 64a from which it is delivered to drive the air turbine 84 on the storage chamber 9a, to drive the reciprocating air engines, and, also through pipe 83 to the inlet tube mounted on shaft 2a where it may be delivered under pressure and mixed with the mixture supplied from mix feed line 10b.

It will be noted that in the form of my invention as shown in Fig. 22, the freezing chamber and all other parts are mounted horizontally instead of vertically as shown in the form of my invention as heretobefore described. I have found that such horizontal mounting has advantages for particular purposes and particular forms of structure to meet special conditions. Also, the use of air driving means instead of cranks, has been found to have advantages to meet particular conditions.

Figure 23:
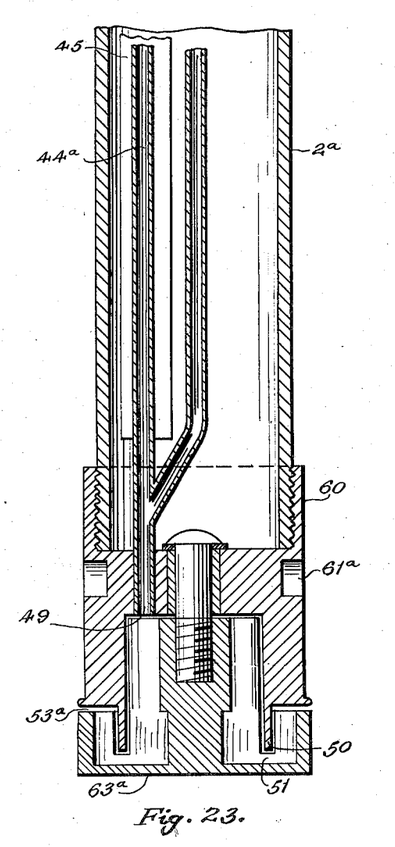
Fig. 23 is a detailed view of the vaporizer head of the modification of Fig. 22, showing the auxiliary air line for delivering air under pressure into the mixture just before its entrance into the impeller chamber.

Fig. 23 shows a detail of a form of my invention wherein cold air under pressure is delivered and mixed with the liquid mixture at a point just ahead of the entrance of the mixture into the impeller chamber but after leaving contact with the electrical heater unit. This reduces the temperature of the mixture from about 142° attained while being pasteurized by contact with the heating unit, to about 80°, which has been found to give better action in the impeller chamber, and to produce better vaporization of the mixture when forced out into the freezing chamber.

In operation, the ice cream mix is poured into the storage chamber, where it is agitated with air under pressure, after which flavoring is added, and from the storage chamber, it is fed into the mix feed pipe inside the casing together with a jet of cold air introduced just outside the casing and delivered to the impeller chamber at the end of the casing. The casing and the mix feed therein do not rotate, which minimizes any churning of the mix in the feed pipe, and avoids butter formation therein. While passing through this mix feed pipe, the mix is raised to pasteurizing temperature by the adjustable heating unit inside the casing. Just before entering the impeller chamber, and after leaving the heating unit, a stream of cold air under pressure, may be injected to cool the mix to about 80° F. In the impeller chamber the mix is rapidly agitated at high speed by the impeller blades and forced through the angularly bent passage and impelled in fine streams into the freezing chamber, where the instantaneous drop from 80° to 32° forms a vapor or fog which quickly freezes to the walls of the freezing chamber. The crank mechanism reciprocates the casing and the vaporizing head back and forth along the length of the freezing chamber, so that the whole surface of the freezing chamber is covered with a succession of layers of frozen cream. The opening of the annular space of the vaporizing head is adjusted according to the kind of mix used and operating conditions. The scraping collar is held stationary at the top of the freezing chamber by the friction of the locking pins and the friction of the scraper blade on the freezing wall, as long as the locking pins do not engage the casing. After about twelve vaporizing strokes of the cylinder, the cam causes the scraping collar to lock on to the casing for about two strokes, and the scraper edge removes the cream from the surface of the freezer chamber in large flakes and forces it into the bossed cup carried on the end of the casing, where it is broken up into flakes of the desired size and drops into the ejector, from which it is removed and placed in a mold if desired, after the desired quantity has been frozen. Sufficient heat is transmitted to the bossed scraper cupped head from the electrical heater to keep the head just warm enough so that the frozen cream will not stick to it. This avoids scraping with a wire brush to clean the discharge orifices as is necessary with counter freezers heretofore used. The bent path through which the cream is forced in the impeller head by projecting ring 50 keeps the mix from coming out too fast into the freezing chamber and regulates its discharge. An individual portion of two ounces, in one of my freezers, will be frozen and delivered in twelve vaporizing strokes and two scraping strokes each taking about 2¼ seconds, or 31½ seconds in all. After the starting button is touched, the numbers of vaporizing and scraping strokes can be adjusted by changing the cams, according to the kind of mix used. The amount of overrun of the product can be adjusted by adjusting the air jet introduced just outside the casing, or inside the casing just before the impeller chamber. In my apparatus, the particularly form of impeller, the bent delivery passage, and narrow annular discharge space, together with the instant cooling from 80° to 32°, produces a fog of very finely divided particles, which has not been produced by any previous apparatus employed by others. The heating of the vaporizing head prevents freezing and obstruction of the annular discharge space. The customer can see the cleanliness of the process, since it is all conducted before his eyes.

Besides its use for freezing liquids, my invention is adapted by reducing the refrigerating action, to cool and frappe various liquids, such as tomato juice, and to impart attractive and desirable qualities thereto, which give them an effervescent and quasi-iridescent quality.

Manifestly, the construction herein shown is capable of considerable modification and such modifications as come within the scope of my claim, I consider within the spirit of my invention.

I claim:—

The continuous method of treating edible fluids in successive steps in a hermetically sealed system, which comprises agitating and refrigerating the edible fluids at one end of the system while maintaining the same above atmospheric pressure, then feeding said fluids by said pressure through an intermediate part of the system while heating same to a pasteurizing temperature, then removing the heat of pasteurization while maintaining the pressure adjacent the remote end of the system and spraying the fluid under pressure to produce particles forming a mist at reduced pressure, then freezing said mist on a surface to form a frozen mass while scraping said surface and collecting said mass at the remote end of the system.

MILTON FEDER.